United States Patent [19]
Reddy et al.

[11] Patent Number: 4,959,229
[45] Date of Patent: Sep. 25, 1990

[54] CHEESE MANUFACTURE

[76] Inventors: Malireddy S. Reddy, ADFAC Labs, Inc., 1250 S. Parker Rd., Denver, Colo. 80231; John Mullen, Ty Mawr. Llandyfrydog, Llanerchymedd, Gwynedd, Wales; Clinton J. Washam, 309 Fairway Dr., Columbus, Wis. 53925; C. Gordon Brown; Charles C. Hunt, both of Bunge Foods Corp., 3582 McCall Pl., N.E., Atlanta, Ga. 30340

[21] Appl. No.: 496,245

[22] Filed: Mar. 20, 1990

Related U.S. Application Data

[63] Continuation-in-part of Ser. No. 283,208, Dec. 12, 1988, abandoned.

[51] Int. Cl.$^5$ .................... A23C 19/02; A23C 19/076
[52] U.S. Cl. ......................................... 426/39; 426/40; 426/582
[58] Field of Search ...................... 426/36, 40, 38, 39, 426/582

[56] References Cited

U.S. PATENT DOCUMENTS 3,620,768 11/1971 Corbin, Jr. ............................ 426/40
3,792,171 2/1974 Little ..................................... 426/40
4,053,643 10/1977 Corbin, Jr. ............................ 426/40
4,352,826 10/1982 Pearline et al. ....................... 426/40

Primary Examiner—Marianne Cintins
Attorney, Agent, or Firm—Terrence W. McMillin

[57] ABSTRACT

An enhancement of cheese yield and quality through a combination of direct acidification and starter cultures is obtained by preconditioning cold, raw milk by lowering the pH and heat treating. Then the milk is cooled and post-acidified prior to inoculating with starter culture.

38 Claims, No Drawings

CHEESE MANUFACTURE

This application is a continuation-in-part of U.S. Patent Application No. 283,208 filed Dec. 12, 1988, now abandoned.

BACKGROUND OF THE INVENTION

1. Field of the Invention

The invention relates to the increasing of cheese yield through incorporating a portion of the native whey proteins and residual fat in the cheese curd through preconditioning, high temperature treatment of the milk, and post acidification followed by culturing.

2. Description of the Prior Art

Prior art will be divided into two broad areas of technology: (A) cheese manufacture, and (B) chemical acidification.

A. Cheese manufacture.

There are over 400 different varieties of cheese. The basic steps of their production and the concepts behind those steps have been presented masterfully by E. R. Vedamuthu and C. J. Washam in the fourth chapter of Biotechnology, Volume 5 (Verlag Chernie, 1985). It would not be appropriate to repeat that material here. However, the manufacture of mozzarella will be given special treatment because it is particularly suited to the practice of this invention and, in fact, will serve as the model system to demonstrate the superiority of the invention over conventional practices.

A brief description of the commercial manufacture of mozzarella cheese is as follows: Raw milk is delivered to the processing plant, where it is stored in a milk silo. When processing is to begin, the milk is moved through a transfer line to a balance tank. From the balance tank, the milk is sent to a pasteurizer, which is operated as a two-sided heat exchanger. The cold milk continuously passes through the first side of the exchanger, where it is warmed to the desired maximum temperature. Then the milk passes through the second side of the exchanger, where it returns heat to the first side, cooling the pasteurized milk. The time of pasteurization can be controlled by the flow rate through the heat exchanger. For mozzarella cheese, the raw milk is pasteurized at 162° F. for 16 sec., cooled to 88° to 96° F., and then added to a stainless steel cheese vat. (Raw milk is currently a major cause of manufacturing problems because the composition of the milk will vary according to weather, breed of cows, season, geographic area, feed, etc.) At the beginning, middle, or at the end of fill, starter bacterial cultures (composed of coccus and rods) are added to the milk at pH 6.5 to 6.80. The milk is allowed to ripen for 15 to 45 min. At the end of the ripening period, a coagulator preparation (a proteolytic enzyme extracted from calf stomach or from microbial cultures) is added to the milk at the rate of about 3 oz./1000 lbs. of milk. The agitators are shut off after adding the coagulator and the milk is allowed to coagulate for a period of 15 to 30 min. After coagulation of the milk, the coagulum is cut into small cubes so that whey can be expelled from the curd. Then the curd is allowed to settle to the bottom of the vat without stirring for a period of 5 min. After heating for 5 min. the agitators are started and the curd is cooked to 98° to 118° over a period of 30 to 60 min. Then the curd is allowed to sit under whey or warm water or on cheddaring tables until pH drops to 5.1 to 5.40. If the pH of the curd is going to go lower (below pH 5.1), cold water (50° to 60° F.) can be added to the curd to retard further production of acid by starter bacteria. After the curd attains the right pH, it is either cheddared and milled or put into a cooker (mixer and molder) containing water at 135° to 180° F. and mixed and molded into cheese bodies. It is an option at this stage either to add salt before the curd goes into cooker or to add salt to the mixer directly or to omit the addition of salt. After the curd is molded, it is cooled by suspension first in cold water, then in cold brine (60 to 80% salt concentration). After 1 to 12 hours, the brined cheese body is removed, diced or shredded and/or packaged and stored at 40° F. until used to make pizza pie (7 to 10 days after packing). Several problems are encountered with the traditional procedure. They are as follows.

The coccus to rod ratio dictates the body, stretch, browning, and oiling off of the cheese on pizza pie after it is baked. If the coccus population is too high, (10 to 20:1, c:r ratio), the cheese will be tough, will not stretch enough, and will exhibit excessive browning after it is baked. On the other hand, if the rod population happened to be too high in the starter culture or in the cheese, the resultant mozzarella cheese will exhibit too much stretch, too much tenderness, and excessive oiling off, acid flavor, and a significantly decreased browning on pizza pie. In the production of high quality mozzarella, one culture species cannot be used interchangeably for the other. So, it is imperative that coccus to rod ratio be controlled with utmost care in the starter tanks by varying the temperature of set. Even though the coccus and rod ratio is adjusted properly in the starter tanks, sometimes the ratios will change during the manufacture of cheese due to the presence of antibiotics, bacteriophage, and increase or decrease of total protein in the milk, pH of the milk, and source of the milk (breed of the cows) and temperature variations. Let us look at how these variations will influence the quality of cheese.

1. Initial pH of the Milk and its Effect on Quality of Cheese:

If the initial pH of the milk is 6.45 to 6.55, the coccus population will start growing during ripening until the pH decreases to 5.8. At this stage the rod population will start growing along with coccus and, as the pH continues to decrease, the rod population will start building up. By knowing this behavior in making mozzarella cheese, coccus to rod ratios can be adjusted in the starter tank anywhere from 1:1 to 3:1 (c:r). However, if the pH of the raw milk happens to be 6.8 to 6.85, even though the c:r ratio is adjusted in the starter tank, still the coccus population will build up in higher concentration than the rods and thus will alter the functionality of mozzarella cheese. On the other hand, if the pH of the milk happens to be 6.3 to 6.4, the resulting products will have more rods, thus altering the quality of the product. This is why, even though the coccus to rod ratio is controlled in the starter tanks, due to the variance in initial pH of the milk (weekly, monthly or seasonal), uniform cheese quality is very hard to attain. A skilled cheese maker can control this problem by making extensive changes during manufacture. Such changes are cumbersome and in turn will alter the chemical properties of the finished product.

2. Total Protein Content of the Cheese and its Effect on Cheese Quality:

If the total protein in the milk is 3.1 to 3.2 (which is average), a coccus to rod ratio of 1:1 to 3:1 will drop the pH of the milk steadily and the quality of the cheese will be normal. On the other hand if the protein of the milk happens to be higher, such as 3.4 to 3.5, even though the c:r ration in the starter tank remains at 1:1 to 3:1, the coccus population will dominate and thus will alter the functionality of the cheese. The coccus population will build up because of the buffering action of the protein coupled with the low ripening temperature. On the other hand if the protein content of the milk happens to be lower, i.e. 2.7 to 2.9, the rod population will dominate in the cheese and thus will alter the performance on pizza pie. This is the reason why there is a tremendous variation in the quality of the mozzarella cheese. Again, a skilled cheese maker can get around this problem by skillfully making changes during the manufacture of cheese. Still it is a hit and miss proposition and will endanger the ability of the cheese to meet compositional specifications of customers.

3. Bacteriophage and their Effect on the Quality of Mozzarella Cheese:

Bacteriophage (phage) is a bacterial virus which will lyse bacterial cells, making them unable to produce acid and flavor during the manufacture of cheese. Phage for both the coccus and rod cultures used in the manufacture of mozzarella cheese normally are found in the plant environment. Even though the coccus and rod cultures are protected in the starter tank, once they are added to the cheese milk, any phage present in milk will attack these organisms. If the coccus phage is present and destroys a majority of the cocci, the resulting cheese will be pasty and will exhibit an extensive oiling-off defect on pizza pie. On the other hand, if the rod phage destroys most of the rods, the resultant cheese will be tougher, will not stretch on pizza pie and will exhibit extensive browning. In addition, lysis of the starter bacteria by phage will cause extensive delays in the manufacturing time of the cheese, causing serious economic losses. Bacteriophage frequently are present in raw milk and are not killed by pasteurization at 162° F. for 16 sec.

4. Prevalence of Pathogens During Conventional Cheese Manufacture:

During traditional cheese manufacture (with starting milk pH 6.3 to 6.7), pathogenic bacteria such as Listeria, Staphylococci, and Salmonellae, can grow to higher numbers. This will happen especially when the starter bacteria are slow due to inherent culture characteristics, the presence of antibiotics such as penicillin, agglutinins, the presence of accidental sanitizing compounds in the milk, or due to the dreadful bacteriophage which will kill starter bacteria. Under these conditions, the pathogenic bacteria will grow faster because they prefer to grow above pH 6.0, and, also, they will not have any competition from the growth of dairy starter bacteria. Recently there have been many deaths reported due to the growth of pathogens in dairy products.

B. Chemical Acidification of Milk for Cheesemaking.

An obvious means of circumventing many of the problems encountered during the manufacture of cheese using bacterial cultures is the direct addition of an acidulant to the milk. Such addition of an acid (phosphoric, lactic, acetic, etc.) or an acidogen (glucono-delta-lactone (GDL), sodium bisulfate, etc.) must be done under carefully controlled conditions to prevent coagulation or agglomeration of the casein.

Queso blanco, Latin American white cheese, ricotta and other cheeses have been made commercially for over 25 years using vinegar, acetic, citric, lactic and phosphoric acids, and lemon juice as the acidulant.

The most commonly used method of direct acidification in the U.S.A. utilizes phosphoric acid as the primary acidulant to reduce the pH of cold (35°–55° F.) milk to just short of the point of casein precipitation (pH 4.9 to pH 5.4). The milk then is warmed to about 90° F. and a secondary acidulant, the acidogen GDL, is added to bring the pH down to the isoelectric point slowly with the aid of a coagulating enzyme.

U.S. Pat. No. 2,982,654 (Hammond and Deane, 1954) reveals the manufacture of "cheese curd" from chemically acidified milk. An acidogen such as gluconodeltalactone was used in conjunction with a coagulator to produce a cuttable cheese curd. Microbial fermentation was eliminated. Major deterrents to commercial application are: the cost of using only GDL, the greatly prolonged coagulation time and the lack of flavor development in ripened cheeses, because of the absence of microbial enzyme systems.

U.S. Pat. No. 3,298,836 (Ernstrom, 1967) teaches the acidification of cold (35°–50° F.), high solids (14–16%) milk to pH 4.5–4.7 with free acid (mainly hydrochloric). The cold, acidified milk is warmed without agitation to 70°–140° F. using special, expensive equipment to facilitate coagulation and curd formation for the manufacture of cottage cheese. No acidogen, such as GDL, or bacterial cultures are used. The process proved too unwieldy and expensive for commercial practice.

U.S. Pat. No. 3,411,920 (Holder and Morgan, 1968) teaches the addition of acid to the vat shortly after the curd is cut to bring the pH of the whey down from pH 4.65–4.80 to pH 4.0–4.4 during the manufacture of soft, unripened cheese. In commercial practice today this is called "cooking acid" and is frequently used, but is not considered a process of "direct acidification."

U.S. Pat. No. 3,620,768 (Corbin, 1971) relates to a method for manufacturing unripened cheeses, such as cottage cheese, by direct acidification. Organic and inorganic acids are used to acidify cold milk (32°–45° F.) to pH 4.88–5.20. The milk is then heated to 60°–100° F. before the addition of a coagulator and a final acidogen (GDL), which brings about a cuttable cheese curd. The main disadvantages are:

1. Acidification of cold milk (32°–45° F.) requires a lengthy and costly heat up time.

2. In commercial practice the pH of the milk increases 0.1 to 0.3 pH units and requires monitoring with subsequent adjustments in the amount of GDL needed to set the vat.

3. The patent is limited in commercial application to unripened cheese varieties because there are no body, flavor and texture building microbial systems which are essential in the manufacture of ripened cheeses.

U.S. Pat. No. 3,882,250 (Loter, et al., 1975) teaches the same principles as U.S. Pat. No. 3,620,768 (Corbin, 1971) except that an improved method of acid addition and mixing is utilized to allow milk to be acidified warm at 59°–86° F. instead of cold at about 32° to 45° F. The Loter patent claims teach acidification of milk at 61.7° to 86° F. and then "maintaining the acidified milk at about the same temperature and adding thereto—acidogen—and—proteolytic enzymes." This simply means that the temperature of acidification and the setting temperature must be substantially the same.

U.S. Pat. No. 4,374,152 (Loter, 1983) teaches a procedure of making acid cheese curd which is similar to that of U.S. Pat. No. 3,882,250 (Loter, et al., 1975) except that acid salts such as sodium bisulfate replaced the use of free acids and truly makes warm acidification economically attractive. A lower pH can be attained using sodium bisulfate as the primary acidulant as compared to using phosphoric acid under similar conditions. This reduces the amount of GDL, required as the secondary acidulant and reduces the cost of the process.

U.S. Pat. No. 4,352,826 (Pearline, et al., 1982) teaches that the salt of an acid (sodium bisulfate) in U.S. Pat. No. 4,374,152 can be replaced by a mixture of an acid salt and a free acid (sodium bisulfate plus sulfuric acid).

As presented in this brief review of prior art, several patents teach the concept of making acid cheese curd by direct acidification, but most relate to soft, unripened cheeses. It is also noted that none of the patents employ, as an element of the invention, a high heat treatment so as to incorporate more whey protein into the cheese curd. Likewise, none of the patents teach the preconditioning or pre-acidification and culturing to make cheeses and especially ripened cheeses.

The concept of high heat treatment alone, to increase cheese yield, has been proposed:

U.S. Pat. No. 3,316,098 (Noznick and Bundus, 1967) teaches that an increased yield of cheddar or cottage cheese can be realized from milk which has been given a heat treatment "substantially above" minimum pasteurization. This temperature was defined as 185° F. for at least 15 minutes or 300° to 305° F. for 1 second or less. The temperature used for a 15 second holding time was 255° F.

This invention found little commercial application because the temperatures were too high, the times too long and the cheese produced was of inferior quality because of the cooked flavor, off color and body defects. Compared to the present invention, the Noznick patent does not utilize preconditioning nor employ a combination of direct acidification and culturing. Moreover, the present invention, through the mechanism of preconditioning, utilizes much less severe and damaging temperatures, i.e., 185° F. versus 255° F. for 16 seconds.

U.S. Pat. No. 4,416,905 (Lundstedt and Corbin, 1983) teaches that buttermilk, sour cream and yogurt can be made by a combination of culturing and direct acidification. Culturing is the first phase of the product process and is allowed to progress until reaching pH 5.2–6.2 in order to develop the desired flavor intensity. Culturing then is followed by direct acidification to pH 4.7 or below using certain food grade acids.

SUMMARY OF THE INVENTION

The present invention utilizes the stage of direct acidification first to minimize the deleterious effects of pathogens, spoilage bacteria and phage. In addition, cultures grown at the lower pH ranges that result from this primary acidification stage tend to develop more powerful and extensive flavor and body producing systems that result in finished products of higher quality.

The culturing stage is incorporated because of its inherent importance in virtually all cheese varieties.

There are several reasons for the use of starter cultures in conjunction with the use of direct acidification:

1. They aid in the setting or coagulation of the milk by producing acid.
2. They help promote and control whey expulsion.
3. They contribute to the changes that take place during such stages as matting and cheddaring.
4. They govern the development of the characteristic flavor, body and texture in most varieties of cheese.
5. They reduce the effects of spoilage organisms during manufacturing and curing.
6. They function symbiotically with various advantageous organisms that characterize certain cheese varieties (such as *Brevibacterium linens* on brick and Muenster cheeses).
7. Cheeses such as mozzarella need starter cultures to decrease browning, improve stretch and tenderness in the finished product.

The primary object of this invention is to make cheese in a relatively faster time without any failures due to bacteriophage, by using a combination of direct acidification and culturing. It is another object to eliminate the survival of Listeria monocytogenes, Staphylococci, and Salmonellae in the cheese.

It is another object to make top quality cheese without having to modify a standard manufacturing procedure because of protein, mineral, or pH variations in the raw milk.

It is another object to improve cheese yield by decreasing the loss of whey protein and whey fat into the cheese whey. It is believed, without being bound thereby, that preacidification followed by heat treatment at or above pasteurization temperature offers advantages over previous yield improvement processes by complexing and denaturing the whey proteins. Thus, the increase in yield due to whey protein incorporation is not so limited by negative effects in the final cheese. Further, whey proteins incorporated by practicing this invention are better able to bind fat and water to reduce losses and control moisture.

It is another object to decrease or eliminate the use of calcium chloride without any substantial delay in the coagulation time of the curd.

Another object is to decrease the usage of expensive coagulant (rennet) during the manufacture of cheese.

It is another object to increase the yield of directly acidified cheeses through incorporation of whey proteins into the curd by preconditioning before pasteurization.

A further objective is to shorten the time required for pasta filata cheese to develop proper melt characteristics. Mozzarella cheese made according to this invention is ready to use directly from the brine, unlike traditional mozzarella cheese which will not melt until it has five to ten days of age. It is believed, without being bound thereby, that acidification and heat treatment serves to control calcium content and convert casein in the milk to a form which imparts plasticity and fat retention in the curd.

According to the invention, an improved method is disclosed for making cheese, of the type wherein cold, raw milk is heat treated, inoculated with starter culture, ripened, and treated with a coagulating agent to form a curd, after which the curd is cut, cooked, and, according to the type of cheese being produced, then cheddared, or pressed, or mixed and molded to form cheese bodies. The improvement is characterized in the steps of, first, preconditioning the cold, raw milk by lowering the pH prior to heat treating. Subsequently the preconditioned milk is heat treated and cooled. Then, cooled milk is postacidified prior to inoculating with starter culture.

The same improved method steps can be applied to producing Cottage cheese, wherein a coagulating agent generally is added. In addition, if a supply of milk having sufficiently low pH is obtainable, the preconditioning step may be unnecessary.

DETAILED DESCRIPTION OF THE INVENTION

Cold, raw milk is acidified using an acidulant, preferably phosphoric or acetic acid, to achieve pH 6.0 to 6.6, preferably pH 6.3-6.5. Such acidification may also be accomplished using other food grade organic or inorganic acid, bacterial fermentation, acidogens, or other food grade substances that promote pH depression or alter the free mineral balance (especially calcium) in milk, alone or in combination. This step is called "preconditioning" and is preferably accomplished by using a metering pump, an inline injector and an inline static mixer to mix a controlled amount of liquid acid with cold milk under vigorous agitation.

Preconditioned milk may be stored in a tank or silo or it may be pasteurized immediately at temperatures in the range of 162°-190° F. for 16 seconds to 2 minutes.

The preconditioned, pasteurized milk is then cooled to 50°-112° F., depending on the cheese variety and then further acidified to pH 4.9 to 5.9, depending on the cheese variety. This acidification after pasteurization is termed "post acidification" and is carried out using organic or inorganic acids, acidogens or other food grade substances that increase the hydrogen ion concentration either alone or in any combination and either diluted or concentrated and either liquid, solid, encapsulated or coated. Preferably, a liquid acid is metered into the cooled milk through an injector followed by vigorous mixing through an inline mixing device.

The invention is useful in the manufacture of several cheese types, including mozzarella, cottage cheese and cheddar.

For mozzarella, cold raw milk is preconditioned using a food grade acidulant, preferably phosphoric acid, acetic acid or a combination of phosphoric and acetic acid, to pH 6.0 to 6.6, preferably to pH 6.3-6.5. The preconditioned milk is pasteurized at a temperature in the range of 162°-190° F. for 16-30 seconds, preferably 175-185° F. for 20-25 seconds. The preconditioned, pasteurized milk is then cooled to 90°-105° F., preferably 95°-100° F. The cooled milk is post-acidified to pH 5.4-6.0, preferably pH 5.7-5.8, by metering liquid phosphoric or acetic acid or a combination of phosphoric and acetic acid through an injector followed by vigorous mixing by an inline mixing device.

After postacidification, the temperature of the milk is adjusted to the optimum temperature for the starter bacterial culture being used. The starter culture is then added at the rate of 0.1 to 3.0 percent, preferably 0.5 to 2.0 percent, depending on starter type and activity. The starter cultures used here could be either traditional coccus and rod cultures, lactic cultures or combinations of these cultures. *Lactobacillus helviticus* strains may be added to control melt and browning in the finished mozzarella. Acceptable cultures are commercially available from ADFAC Laboratories, Denver, Colorado and others. If coccus and rod cultures are used, the coccus to rod ratio is adjusted to 1:5 to 10:1, preferably to 1:1 ratio. The starter cultures could be grown in starter media such as phage resistant phosphated or citrated media or in reconstituted nonfat dry milk media. Frozen concentrated cultures or lyophilized cultures or genetically altered or laboratory prepared cultures also could be used to innoculate the postacidified milk. Then, the postacidified milk is allowed to ripen for up to 45 minutes.

A coagulant is added at the rate of 0.1 to 3 ounces per 1000 pounds of milk, preferably 0.1-0.15 oz./1000 lbs. of a double-strength coagulant ("RENZYME" from Marshall Products, Madison, Wisconsin). The milk is allowed to coagulate at about 95°-100° F. for a period of 5 to 45 minutes, preferably 20-30 minutes. The curd is then cut into small cubes, preferably about ½-inch cubes. Using gentle agitation, the entire contents of the vat are initially cooked to about 100° F. and then, with more vigorous agitation, to about 108° to 116° F., preferably 112°-114° F., in 20-60 minutes, preferably 30-45 minutes, to toughen the curd.

The curd is allowed to remain in the whey until the pH drops to about 5.0-5.6, preferably to pH 5.2-5.4. The curd may optionally be washed. The curd is then salted at a rate of about 1 to 2 pounds of salt per 100 pounds of cheese curd.

The mozzarella cheese is then mixed and molded into cheese bodies. After the cheese is molded, it is placed in cold water for a period of 0.5 to 3 hours and transferred to a cold saturated brine until the final salt concentration in the cheese is about 1-2% percent, preferably about 1.5%. After the cheese is taken out of the brine, it can be diced or shredded and packaged, or it can be packaged in block form, the cheese can be stored at 35° to 45° F. or it can be frozen.

For cottage cheese, the process is very similar, cold, raw skim milk is preconditioned to about pH 6.2-6.5, preferably 6.3-6.4. The preconditioned milk is pasteurized at about 162°-190° F., preferably 175°-185° F. The preconditioned, pasteurized milk is cooled to about 32°-115° F., preferably 50°-60° F. and postacidified to pH 4.9-5.2.

The postacidified milk is warmed to about 90° F. and glucono-delta-lactone (GDL) is added at a rate of 3-10 pounds per 100 gallons of skim milk, preferably 4-6 lbs./100 gallons of skim milk, along with a coagulant, preferably rennet, at a rate of 1-2 ounces per 100 gallons of skim milk. After coagulation, about 1 hour, the coagulum (pH about 4.6-4.8) is cut and the resulting curd is cooked in acidified whey (pH about 4.6-4.8) until the proper texture and moisture is reached. The curd may then be dressed and stored under refrigeration.

For cheddar, the preconditioning, pasteurization and postacidification steps are as described for mozzarella. Usually a lactic culture will be used to ripen the cheese, but many variations are possible. Cooking, curd handling and salting follow the normal guidelines for cheddar. The final curd is pressed into cheese bodies and aged to the desired flavor level.

The description of the invention and the following examples are set forth for purposes of illustration only and are not to be construed as limitations on the invention except as set forth in the appended claims.

Example 1

This example is presented to show the effect of initial pH of the milk, heat treatment, and pH of the milk at the time of renneting on the whey protein retention. The pH of the cold, raw milk (4° C.) is adjusted to the appropriate pH using a combination of acetic and phosphoric acid. After adjusting the pH, the milk is pasteurized to the appropriate temperature. The holding time of the pasteurizer was adjusted to 16 sec. After pasteurizing, the milk is automatically cooled to 75° F. and acids are injected into the milk to adjust the pH down to 5.70. A sample of the milk where the pH is not adjusted after the heat treatment served as a control. In the cheese vat, the temperature of the milk is raised to 90° F. and coagulant is added at the rate of 2 oz./1000 lbs. of milk. After the curd coagulation, the curd mass was cut into ¼ inch uniform cubes using a curd knife. The curd particles were allowed to settle for 5 min. and whey was drawn at that stage for the protein determination. The proteins were determined by using dye binding procedure using orange "G". In the particular example, the initial pH's of the cold, raw milks were adjusted to 6.30, 6.45 and 6.50. The heat treatments selected were 162° F. and 185° F. for 16 sec. The results of this example are presented in Table 1. It is obvious from these data that preacidification of milk has significant effect on increasing the whey protein retention provided that the heat treated milk (185° F. for 16 sec.) is post acidified below pH 6.4 and perhaps to pH 5.7 using the food grade acetic or vinegar and/or phosphoric acid. In the similarly heat treated milk when it is not post acidified, the whey protein retention is significantly decreased. The preacidification, high temperature treatment (185° F. for 16 sec.), and post acidification to pH 5.70 prior to renneting had a pronounced effect on the retention of whey protein and thus increases the cheese yields. In some instances even though milk is not preacidified, whey protein retention is observed provided milk is heat treated to about 185° F. for 16 sec. However, it is a must that such milk should be post acidified to below pH 6.4 and preferably pH 5.7 prior to renneting. Again, the whey protein retention is significantly better if the same milk is preacidified, heat treated to about 185° F., and then post acidified to about pH 5.70 prior to renneting.

ature treatment (185° F. for 16 sec.) on the retention of whey proteins in the cheese curd. The medium selected for the growth of the coccus and rod mozzarella cheese starter cultures was phage resistant phosphated starter medium. The medium was reconstituted to 7.0% solids and heat treated to 190° F. for 1 hour and cooled to 110° F. Coccus and rod cultures were inoculated into the medium and allowed to incubate until pH dropped to 5.0. At this stage, the medium was neutralized to pH 6.2 using sodium hydroxide and was further allowed to incubate until pH dropped to 4.2. The culture was cooled to 60° F. and used as a starter culture to inoculate the milk (1.5%) after postacidification to pH 5.70 using vinegar at 32° C. The milk was incubated with culture for 30 min. and then it was renneted using single strength rennet at the rate of 1½ oz./1000 lbs. of milk. After coagulation of the curd it was cut into ¼ inch cubes and then whey was extracted after 5 min. of healing. The whey samples were analyzed for protein.

In this example, the initial pHs of the milk selected were 6.4, 6.6, and 6.85. The post acidification pH was 5.70. The results of this experiment are presented in TABLE 2. The results once again depict that the heat treatment alone (185° F. for 16 sec.) was not enough to retain the whey protein in the curd. The preacidification and post acidification were the key factors in retaining the additional protein in the curd mass. Also, it is quite obvious that the addition of starter culture to the cheese milk had a pronounced effect on the additional whey protein retention. A partial explanation can be the pH lowering effect of bacteria or the physical addition of lactic and phosphoric acid already present in the starter culture growth medium which is added to the cheese milk and causes a change in the mineral balance.

TABLE 1

| No. | pH of the Milk prior to Heat Treatment | Heat Treatment | pH of the Milk prior to Renneting | Percentage of Whey Protein in Whey |
|---|---|---|---|---|
| 1 | 6.50 | 162° F. for 16 sec. | 6.40 | 0.74 |
| 2 | 6.50 | 162° F. for 16 sec. | 5.70 | 0.70 |
| 3 | 6.45 | 162° F. for 16 sec. | 5.70 | 0.69 |
| 4 | 6.30 | 162° F. for 16 sec. | 5.70 | 0.69 |
| 5 | 6.50 | 185° F. for 16 sec. | 6.40 | 0.66 |
| 6 | 6.50 | 185° F. for 16 sec. | 5.70 | 0.56 |
| 7 | 6.45 | 185° F. for 16 sec. | 5.70 | 0.53 |
| 8 | 6.30 | 185° F. for 16 sec. | 5.70 | 0.45 |

Example 2

In this example, the effect of culturing has been evaluated in addition to the preacidification and high temper- Furthermore, the evaluation of cheese curd revealed that starter cultures greatly improved the flavor and texture. When only acid is used, there was no flavor at all in the curd.

TABLE 2

| No. | pH of the Milk prior to Heat Treatment (185° for 16 sec.) | Percentage Addition of Starter Culture to Heat Treated Milk | pH of the Milk prior to Renneting | Percentage of Whey Protein in Whey |
|---|---|---|---|---|
| 1 | 6.85 | NONE | 6.80 | 0.75 |
| 2 | 6.85 | NONE | 5.70 | 0.62 |
| 3 | 6.60 | NONE | 6.53 | 0.63 |
| 4 | 6.60 | NONE | 5.70 | 0.52 |
| 5 | 6.40 | NONE | 5.70 | 0.47 |
| 6 | 6.60 | NONE | 6.48 | 0.64 |

TABLE 2-continued

| No. | pH of the Milk prior to Heat Treatment (185° for 16 sec.) | Percentage Addition of Starter Culture to Heat Treated Milk | pH of the Milk prior to Renneting | Percentage of Whey Protein in Whey |
|---|---|---|---|---|
| 7 | 6.60 | 1.5 PERCENT | 6.40 | 0.63 |
| 8 | 6.60 | 1.5 PERCENT | 5.70 | 0.46 |
| 9 | 6.40 | 1.5 PERCENT | 5.70 | 0.37 |

Example 3

The effects of heat treatment of milk and type of acids used for post acidification were evaluated on the retention of whey proteins and fat in the cheese curd. The temperatures selected for this study were 162° F. and 185° F. for 16 sec. The acidulants used were acetic acid, phosphoric acid and combinations of acetic and phosphoric acid. In all the trials, the post acidification was carried to pH 5.70. The rest of the procedure was the same as in examples 1 and 2. The results of this experiment are presented in TABLE 3. From these data, it is obvious that more fat can be retained in the cheese along with the whey proteins. Phosphoric acid has more fat retention value than the acetic acid. A combination of phosphoric and acetic acid, used as post acidulants, on milk heat treated to 185° F., has a beneficial effect on trapping both the whey protein and fat into the curd mass. Both the fat and protein retention are higher when the milk is heat treated at 185° F. for 16 sec. than at lower heat treatment temperatures. This experiment also demonstrates that both organic and inorganic acids are functional in this invention.

TABLE 3

| No. | Heat Treatment of the Milk | Type of Acid Used | Percentage of Fat in Whey | Percentage of Whey Protein in Whey |
|---|---|---|---|---|
| 1 | 162° F. for 16 sec. | ACETIC | 0.40 | 0.75 |
| 2 | 185° F. for 16 sec. | ACETIC | 0.30 | 0.59 |
| 3 | 162° F. for 16 sec. | PHOSPHORIC | 0.15 | 0.72 |
| 4 | 185° F. for 16 sec. | PHOSPHORIC | 0.10 | 0.42 |
| 5 | 162° F. for 16 sec. | ACETIC PLUS PHOSPHORIC | 20.5 | 0.69 |
| 6 | 185° F. for 16 sec. | ACETIC PLUS PHOSPHORIC | 0.15 | 0.45 |

Example 4

The effect of heat treatment and heat treatment plus post acidification upon the survival and proliferation of *Streptococcus thermophilus* bacteriophage was evaluated in this experiment. Active bacteriophage preparation was inoculated into phage free raw milk to arrive at a final concentration of 4000/ml. This was verified by plaque assay. The milk with phage was heat treated to 162° F., 175° F., and 185° F. for 16 sec. The heated milk samples were cooled to 90° F. and they were divided into two equal portions. To one portion, vinegar was added to arrive at pH 5.7. Both the samples of milk (with and without post acidification) were inoculated with active coccus and rod culture and were incubated at 90° F. for 30 min. Then the temperature of the milk was raised to 104° F. and held at that temperature for an additional 2 hours. At the end of the incubation, all the tubes were titrated to determine the bacteriophage concentration. The bacteriophage selected for this study is a coccus phage which is specific to the coccus component of the coccus and rod culture used as starter. The idea behind this experiment is to study the following:

1. The effect of heat upon survival of bacteriophage.
2. The effect of post acidification pH upon the revival of the thermally injured bacteriophage upon further incubation.

The results of this study are presented in TABLE 4. It is obvious from these data that the traditional pasteurization temperature of 162° F. for 16 sec. could not inactivate the coccus bacteriophage. However, post acidifications of the milk heat treated to 162° F. for 16 sec., totally retarded the revival of the thermally injured bacteriophage. The temperatures 175° and 185° F. definitely exhibited a drastic destructive effect upon bacteriophage. This has a tremendous significance in that the bacteriophage present in the regular cheese milk cannot be inactivated by the ordinary pasteurization temperature and, thus, this dreadful virus can inactivate the starter bacteria in the cheese vat. So, using our proposed invention bacteriophage can be brought under control, irrespective of whether it is present in raw milk or appeared as contaminant after pasteurization of milk.

TABLE 4

| No. | Heat Treatment of the Milk | Milk pH at the time of Inoculation | Initial Phage Counts/Gram, Prior to Heat Treatment | Final Phage Count/Gram at the End of Incubation |
|---|---|---|---|---|
| 1 | 162° F. for 16 sec. | 6.5 | 4000 | 220 |
| 2 | 162° F. for 16 sec. | 5.7 | 4000 | <10 |
| 3 | 175° F. for 16 sec. | 6.5 | 4000 | <10 |
| 4 | 175° F. for 16 sec. | 5.7 | 4000 | <10 |
| 5 | 185° F. for 16 sec. | 6.5 | 4000 | <10 |
| 6 | 185° F. for 16 sec. | 5.7 | 4000 | <10 |

Example 5

The effect of heat treatment employed in the current embodiment upon the survival of *Listeria monocytogenes* was evaluated. To the raw milk *Listeria monocytogenes* was added to arrive at a population of 28 to $34 \times 10^4$/Ml. Then it was divided into 3 fractions and was heat treated at 165°, 175° and 185° F. for 16 sec. Immediately after the heat treatment *Listeria monocytogenes* counts were determined. The results of this study are presented in TABLE 5. It is apparent from the data when high concentrations of Listeria are present in raw milk, the normal pasteurization temperatures are inadequate to destroy these organisms. The temperatures where we can complex the whey proteins to caseins are found to be adequate to destroy this dreadful pathogen.

TABLE 5

| No. | Heat Treatment of the Milk | Initial *Listeria Monocytogenes* Count/Gram Prior to Heat Treatment | Final *Listeria Monocytogenes* Count/Gram After Heat Treatment |
|---|---|---|---|
| 1 | 162° F. for 16 sec. | $34 \times 10^4$ | 20 |
| 2 | 175° F. for 16 sec. | $28 \times 10^4$ | <10 |
| 3 | 185° F. for sec. | $28 \times 10^4$ | <10 |

Example 6

The experiment is designed to see if the current procedure described in this application has any detrimental effect on Listeria. The Listeria impregnated raw milk was divided into several fractions. They were subject to three different heat treatments i.e. 162° F., 175° F., and 185° F. After the heat treatment, the milk was cooled to 90° F. and it was further divided into four fractions. One served as the control, the second fraction was adjusted to pH 5.70 using acetic acid, the third fraction was inoculated with coccus and rod culture without any post acidification, and the fourth fraction was post acidified to pH 5.70 and then inoculated with coccus and rods. All four samples were incubated at 90° F. for 30 min. and then the temperature was raised to 104° F. and held at that temperature for an additional two hours. At the end of incubation, the samples were inoculated into the Listeria enrichment broth and incubated for 1 day and 7 days. At the end of the enrichment periods, the Listeria counts were determined. The similar procedure was repeated with 175° F. and 185° F. heat treatments. The results of these experiments are presented in TABLE 6. These results clearly indicate that 162° F. for 16 sec. (the normal pasteurization temperature used with cheese making) is inadequate to inactivate Listeria. However using our current procedure, i.e. post acidification to pH 5.70 and then inoculating with starter cultures, inactivated the thermally injured Listeria organisms. The post acidification alone or culturing without post acidification treatment were inadequate to inactivate the growth of thermally injured Listeria organisms. However, heat treatments at 175° F. or 185° F., totally inactivated the Listeria organisms.

TABLE 6

| | | | | *Listeria Monocytogenes* Counts/Gram: | | |
|---|---|---|---|---|---|---|
| | | | | | After Heat Treatment | |
| No. | Heat Treatment of the Listeria Impregnated Milk | Milk pH Prior to Incubation | Addition of Starter Culture Prior to Incubation | Prior to Heat Treatment | With 24 hr. Enrichment | With 7 Day Enrichment |
| 1 | 162° F. for 16 sec. | 6.50 | None | $130 \times 10^4$ | 10 | 400 |
| 2 | 162° F. for 16 sec. | 5.70 | None | $130 \times 10^4$ | <10 | 400 |
| 3 | 162° F. for 16 sec. | 6.50 | 1.5 Percent | $130 \times 10^4$ | 10 | 20 |
| 4 | 162° F. for 16 sec. | 5.70 | 1.5 Percent | $130 \times 10^4$ | <10 | <10 |
| 5 | 175° F. for 16 sec. | 6.50 | None | $130 \times 10^4$ | <10 | <10 |
| 6 | 175° F. for 16 sec. | 5.70 | 1.5 Percent | $130 \times 10^4$ | <10 | <10 |
| 7 | 185° F. for 16 sec. | 6.50 | None | $130 \times 10^4$ | <10 | <10 |
| 8 | 185° F. for 16 sec. | 5.70 | 1.5 Percent | $130 \times 10^4$ | <10 | <10 |

Example 7

This example is designed to check the effect of our proposed procedure on the growth of Listeria, salmonella, and staphylococci added to the milk after heat treatment. In this example, the milk was heat treated at 162° F. for 16 sec., cooled to 90° F. and divided into several fractions. The active salmonella, staphylococci and Listeria organisms were inoculated separately into heat treated milk. Then each fraction was further subdivided into four fractions and they were treated using the same procedure outlined in Example 6, except the samples were incubated at 99° F. for 4 hours. At the end of the incubation, the samples were analyzed for the enumeration of salmonella, staphylococci, and Listeria. The results are presented in TABLE 7. It clearly proves that neither postacidification alone nor culturing without postacidification alone are adequate to prevent the multiplication of these pathogenic micro-organisms. Using our proposed procedure, i.e. acidification to pH 5.70, inoculating with starter cultures, and then incubating for 4 hours at 99° F. had a pronounced effect on preventing the multiplication of these pathogenic micro-organisms. This has a tremendous public health significance, considering the number of food poisoning episodes we have had in the past few years.

TABLE 7

| No. | Bacterial Strain | Initial Bacterial Count/Gram Prior to Post Acidification And/or Culturing | Final Bacterial Count/Gram After Culturing Without Post Acidification | Final Bacterial Count/Gram With Post Acidification But No Culturing | Final Bacterial Count/Gram With Post Acidification And Culturing |
|---|---|---|---|---|---|
| 1 | LISTERIA MONOCYTOGENES | $32 \times 10^3$ | $260 \times 10^3$ | $230 \times 10^3$ | $36 \times 10^3$ |
| 2 | SALMONELLA TYPHIMURIUM | 20 | $100 \times 10^1$ | 130 | 15 |

TABLE 7-continued

| No. | Bacterial Strain | Initial Bacterial Count/Gram Prior to Post Acidification And/or Culturing | Final Bacterial Count/Gram After Culturing Without Post Acidification | Final Bacterial Count/Gram With Post Acidification But No Culturing | Final Bacterial Count/Gram With Post Acidification And Culturing |
|---|---|---|---|---|---|
| 3 | STAPHYLO- COCCUS AUREUS | 10 | 170 | 56 | 3 |

Example 8

To evaluate the effectiveness of calcium chloride on cheese made using our current procedure, two levels of this approved chemical were tried. The mozzarella cheese was manufactured by starting with cold, raw milk. Initially cold, raw milk was acidified to pH 6.45 using a combination of acetic, phosphoric, and lactic acid. The milk was pasteurized to 175° F. for 16 sec. and was cooled to 70° F. At that stage it was post acidified by injecting a combination of vinegar, phosphoric, and lactic acids; then, post acidification was carried to pH 5.70. The milk after post acidification was warmed to 90° F. At this stage lactic starter culture grown in phage resistant medium was used at the rate of 1.0 percent. The lactic starter culture used in this example was made of strains of Streptococcus lactis, Streptococcus cremoris and other lactic group of streptococci, perhaps with an inclusion of Leuconostoc citroyorum. The milk was allowed to ripen for 30 min. Halfway through the ripening, the appropriate amount(s) of calcium chloride was added. Calcium chloride was not added to the control cheese vat. At the end of the ripening, diluted rennet enzyme (a combination of veal and microbial) was added at the rate of 3 oz./1000 lbs. of milk. After the coagulation of milk, the gel was cut into ¼ inch pieces, allowed to settle for 5 min. and was cooked to 104° F. within a span of 30 min. Then the whey was drained partially and the rest of the mass was transferred onto a table and it was cheddared. When the pH of the curd was lowered to 5.3 to 5.4, it was mixed and molded into cheese bodies. The cheese bodies thus obtained were cooled in cold water and then brined in a salt solution and shredded for evaluation on pizza. The two concentrations of calcium chloride tested were 0.01 and 0.02 percent. The length of coagulation was observed closely. After the manufacture of cheese, the firmness was evaluated on the second day. The experimental cheese was shredded and used at the rate of 5 oz. per 12 inch pizza. It was baked for 6 minutes at 580° F. The pizza was cooled for two minutes and evaluated for the melt, browning, oiling-off, stretch and chewiness. The melt was determined by appearance. The browning was determined by counting the number of brown or burn spots on the pizza pie. In addition, the size of the brown spots were also observed. The oiling-off was checked by tilting the pizza to observe the flow of free oil. The stretch was measured by pulling a fraction of cheese from pizza pie. A stretch greater than 6 inches was considered excellent. And stretch less than 2 inches was considered poor. The chewiness was determined by masticating part of the melted cheese. If the cheese could be broken to smaller pieces with 10 to 15 strokes in mouth, it was considered tender or not chewy. If the cheese gave a bubble gum effect in the mouth it was considered tough.

The results of these experiments are presented in TABLE 8. It is clear from these data that calcium chloride is not required to make cheese using our proposed new procedure. Part of the reason being the release of native milk calcium from casein due to the post acidification step. Also, such a cheese was normal in every respect to the cheese made using different levels of calcium chloride.

TABLE 8

| No. | Conc (5) of Added Calcium Chloride in Cheese Milk | Coagulation Time | Body of the Cheese | Functionally of the Cheese on Pizza Pie: | | | | |
|---|---|---|---|---|---|---|---|---|
| | | | | Melt | Browning | Oiling-Off | Stretch | Chewiness |
| 1 | None | 20 Min. | Firm | Good | Slight | None | Excellent | None |
| 2 | 0.01 | 23 Min. | Firm | Good | Slight | None | Excellent | None |
| 3 | 0.02 | 26 Min. | Firm | Good | Slight | None | Excellent | None |

Example 9

To evaluate the level of use of rennet on cheese made using our current procedure, four levels of rennet were tried. The cheese making procedure was the same as in Example 8 except for the following:

1. The milk was heat treated to 180° F. for 16 sec.
2. The pre and post acidification of milk was carried out by suing 50:50 mixture of vinegar and phosphoric acid.
3. The high temperature Streptococcus thermophilus and Lactobacillus bulgarieus cultures were used as starters. They were grown in phage resistant media and the ratio of coccus to rod was adjusted to 5:1.

The levels of rennet tried were 3 oz., 2 oz., 1 oz., and 0.75 oz. per thousand pounds of milk. The coagulation times were monitored. Also, the firmness of the cheese was evaluated on the second day. The cheese was evaluated on pizza pie using the same criteria outlined in example 8. The results of this experiment are presented in TABLE 9. It is obvious from these data that the rennet level can be significantly decreased with the use of our proposed new procedure. The decrease of rennet usage slightly extended the coagulation time. This is not commercially significant because during the normal cheese manufacture renneting time can go as long as 30 to 35 min. It is preferable to have slightly longer renneting time to improve the moisture retention and quality of the cheese.

TABLE 9

| No. | Amount of Rennet/1000 lbs. of milk | Coagulation Time in Minutes | Firmness of the Cheese | Stretch | Melt | Oiling-Off | Chewiness |
|---|---|---|---|---|---|---|---|
| 1 | 3 oz. | 20 min. | Slightly Firm | Excellent | Excellent | Excessive | None |
| 2 | 2 oz. | 23 min. | Firm | Excellent | Good | Slight | None |
| 3 | 1 oz. | 25 min. | Firm | Excellent | Good | None | None |
| 4 | 0.75 oz. | 28 min. | Firm | Excellent | Good | None | None |

Example 10

Mozzarella cheese was made using starter with different coccus to rod ratios. The coccus to rod ratios were adjusted with the aid of temperature. The coccus and rod cultures (supplied by Chris Hansen's Laboratories, Milwaukee, WI) were grown in a phage resistant phosphated starter medium. To arrive at 1:1 ratio the medium was set at 110° to 112° F., whereas to arrive at 10:1 ratio, the medium was set at 106° F. The starter was inoculated into the test milk at the rate of 1.0 to 2.0 percent. The cheese make procedure was the same as in example 8 except for the following:

1. The cheese milk was preacidified, wherever it was required, using the appropriate acid or acids combination.
2. The cheese milk was heat treated at 185° F. for 16 sec.
3. The post acidification was carried out using different acid or acids combination, wherever it was required, to arrive at pH 5.4 to 6.0.

Two ratios that were checked in this example were: 1:1 and 10:1, coccus:rod ratio. Acids that were included in this example were: acetic, phosphoric, and combinations of acetic and phosphoric acid. After making, the cheese was checked for the firmness and functionality on pizza pie using the same criteria outlined in example 8.

The results of this example are presented in TABLE 10. It clearly proves that the firmness of the cheese was greatly improved by raising the concentration of coccus in relationship to rods. However to arrive at average properties it is preferable to adjust the ratios to 3:1 to 6:1 with our current proposed procedure. Excellent mozzarella cheese with good functionality was made using a combination of acetic and phosphoric acid with a 10:1 coccus to rod ratio.

TABLE 10

| No. | Type of Acid Used to Acidify Milk | Coccus to Rod Ratio | Body of the Cheese | Functionality of the Cheese on Pizza Pie: | | | | |
|---|---|---|---|---|---|---|---|---|
| | | | | Melt | Browning | Oiling-Off | Stretch | Chewiness |
| 1 | None | 1:1 | Weak and Pasty | Poor | Excessive | Distinct | Poor | Slightly Chewy |
| 2 | None | 10:1 | Slightly Firm | Poor | Excessive | Average | Poor | Extremely Chewy |
| 3 | Acetic Acid | 1:1 | Weak | Good | Slight | Distinct | Good | Too Tender |
| 4 | Acetic Acid | 10:1 | Firm | Very Good | Medium | None | Excellent | None |
| 5 | Phosphoric Acid | 1:1 | Slightly Firm | Average | Slight | None | Good | Slightly Tender |
| 6 | Phosphoric Acid | 10:1 | Extremely Firm | Average | Medium | None | Excellent | None |
| 7 | Acetic (50%) & Phosphoric (50%) | 1:1 | Slightly Firm | Good | Slight | None | Excellent | None |
| 8 | Acetic (50%) & Phosphoric (50%) | 10:1 | Extremely Firm | Good | Medium | None | Excellent | None |

Example 11

The effect of various acids and combinations of acids on the cheese fines, firmness, and functionality of the cheese was investigated. The cheese making procedure followed was the same as in example 10, except for the following:

1. The coccus to rod ratio was adjusted to 3 to 5:1.
2. Three different acetic and phosphoric acid combinations were tried in addition to pure acids.
3. The preconditioning and post acidification were carried out using the same acid or acids combinations.

The results of these experiments are presented in TABLE 11. From this example, it appears that phosphoric acid is superior to acetic acid in terms of reducing the cheese fines and improving the quality of cheese. However, combinations of 75:25 and 50:50 of phosphoric:acetic yielded excellent cheese too. So, the quality of cheese can be varied by varying the proportion of acids and coccus to rod ratios. This is one of the benefits of this invention.

TABLE 11

| No. | Combination of Acids | Amount of Fines Generated During Cheese Make | Body of the Cheese | Functionality of the Cheese on Pizza Pie: | | | | |
|---|---|---|---|---|---|---|---|---|
| | | | | Melt | Browing | Oiling-off | Stretch | Chewiness |
| 1 | Acetic Acid | Average | Average | Excellent | Slight | Slight | Excellent | None |
| 2 | Phosphoric Acid | Minimal | Extremely Firm | Average | Slight | None | Good | Slight Chewiness |
| 3 | Acetic Acid (25%) & Phosphoric | Minimal | Extremely Firm | Average | Slight | None | Good | Slight Chewiness |

TABLE 11-continued

| No. | Combination of Acids | Amount of Fines Generated During Cheese Make | Body of the Cheese | Functionality of the Cheese on Pizza Pie: | | | | |
|---|---|---|---|---|---|---|---|---|
| | | | | Melt | Browning | Oiling-off | Stretch | Chewiness |
| 4 | Acid (75%) Acetic Acid (50%) & Phosphoric Acid (50%) | Minimal | Firm | Excellent | Slight | None | Excellent | None |
| 5 | Acetic Acid (75%) & Phosphoric Acid (25%) | Average | Average | Excellent | Slight | None | Excellent | None |

Example 12

Raw milk was adjusted to 2.1% milkfat and preconditioned by injecting 80% acetic acid into a flowing stream utilizing a metering pump, inline injector and inline mixer to achieve pH 6.2. The milk was subjected to pasteurization at 174.2° F. for 16 sec. and cooled to 73° F. The preconditioned milk was post acidified to pH 5.68 using a 50:50 mixture of 80% acetic acid and 85% phosphoric acid, inoculated with a rod and coccus starter culture, warmed to 90° F. and set with 1 oz. of rennet per 1,000 pounds of milk. Subsequent cheese manufacture was substantially according to traditional procedure for mozzarella cheese.

Analysis of subsequent whey samples at the end of cooking revealed a fat content of 0.20% and a soluble whey protein content of 0.46% as compared to 0.42% and 0.67% respectively for the control vat whey. This analysis supports a cheese yield increase when the milk is preconditioned to pH 6.2 and when the heat treatment is elevated only to 174.2° F.

Example 13

This example demonstrates the production of cottage cheese by this invention. Forty gallons of skim milk at 42° F. were placed in a jacketed stainless steel tank and preconditioned to pH 6.4 using 85% acetic acid as the conditioner. The preconditioned milk was heated rapidly to 183° F. with no holding time and cooled rapidly to 90° F. It was then post acidified to pH 5.5 by injecting a 37.5% phosphoric acid solution into the flowing milk stream using an inline injector and static mixer and delivered into the cheese vat.

The vat skim, at 90° F. and pH 5.5 was inoculated at the rate of 3% with a lactic culture which had been grown in a phage resistant medium. A ripening time of 130 minutes was required for the culture to bring the pH down to 5.0. Setting was accomplished by adding 22 ml. of single strength rennet, diluted in water. A smooth, shiny, cuttable coagulum developed in 90 minutes. After cutting into ⅜th inch cubes the curd was allowed to remain quiescent for 20 minutes while whey expulsion was initiated.

Thirty-eight ml. of 75% phosphoric acid were distributed on top of the whey and cooking with gentle agitation was begun. The curds were cooked to 127° F. in the usual manner, the whey was drained, and the curds were washed three times in progressively colder changes of water.

The washed and drained curds were dressed with a cottage cheese dressing. Both the dry curds and the dressed curds appeared normal in flavor, body and texture. The whey contained 0.52% soluble protein as compared to the 0.70% for the control vat made in the usual manner by direct acidification.

Example 14

This example demonstrates the production of direct set cottage cheese by this invention. Forty gallons of skim milk at 45° F. were placed in a stainless steel jacketed tank and preconditioned to pH 6.3 using 75% phosphoric acid as the conditioner. The preconditioned milk was heated as rapidly as possible to 180° F. and then cooling was started immediately to adjust the temperature to 70° F. The preconditioned, high heat treated and cooled skim milk was post acidified to pH 5.25 by injecting into the flowing milk stream a controlled amount of 75% phosphoric acid. An inline static mixer was used to facilitate thorough mixing without protein precipitation. The post acidified skim milk was delivered into a cheese vat and warmed with agitation to 88° F.

The acidified skim milk was then set by adding 12 ml. of microbial coagulator and 995 g. of the acidogen glucono-delta-lactone, stirring for one minute and then allowing the mixture to set quiescently for 75 minutes. At the end of the setting time a smooth, shiny coagulum with a pH of 4.68 had formed.

Stainless steel knives were used to cut the coagulum into ⅜th inch cubes which were allowed to contract for about 30 minutes before cooking was begun. Forty-two ml. of 75% phosphoric acid was distributed over the surface of the whey, to lower the cooking pH to 4.4–4.5, the steam was turned on and cooking was initiated with gentle hand stirring. The curd was cooked out in the usual manner to 134° F., the whey drained and the curd was washed 3 times with progressively colder water. The washed and drained curd was normal in body, texture and flavor as both a dry curd and as a dressed curd. Although the finished curd was not weighed to determine yield, a decrease in whey protein from 0.78% in the control to 0.53% in this vat strongly support a yield increase with no loss in cheese quality, just as was experienced with mozzarella.

Example 15

Cheddar cheese was made in this example.

Forty gallons of milk containing 3.4% milkfat were placed in a round, jacketed processing tank equipped with steam heating and cold water cooling. The cold milk at 42° F. was preconditioned to pH 6.3 using an 85% solution of acetic acid and then heated rapidly to 182° F. and cooled with no holding time. After cooling to 90° F., the milk was post acidified to pH 5.6 by injecting 75% phosphoric acid into a flowing stream of milk using an inline injector and static mixer to accommodate acidification without protein precipitation as the milk flowed into the cheese vat.

The acidified milk (pH 5.6) in the vat was inoculated with 1.5% lactic starter culture which has been grown in a phage resistant medium. A ripening time of 45 minutes was allowed before addition of 22 ml. of single strength microbial coagulator. After a setting time of 35 minutes a smooth, shiny coagulum was formed. The coagulum was cut to ¼ inch cubes with curd knives, allowed to contract for 10 minutes and cooked to 104° F. during 40 minutes of constant agitation. The curd was allowed to fall, the whey was drained and the "packing" or matting stage was performed. The matted cheese was cut into slabs and cheddared until it reached pH 5.3. The slabs then were cut into strips using a knife, salted and crudely pressed in a cylindrical metal hoop overnight. The stretch of the slabs during cheddaring was normal and the cheese, after pressing, appeared normal except for few mechanical openings. The soluble protein content of the whey was 0.45% reflecting an increased cheese yield.

Example 16

In this example, six properties of the process of this invention are demonstrated. Those properties are:
1. Function of preacidification and heat treatment of milk.
2. Reduction in the rennet requirement.
3. Reduction in the time required for curd to form. form.
4. Reduction of serum protein content in the whey, corresponding to an increase in protein content in the cheese which results in increased yield.
5. Ability to increase the moisture content of the cheese through increased water binding capacity of the whey proteins.
7. Ability to dice the cheese directly from the brine and freeze it for immediate shipment.

Milk is preacidified using food grade acid to pH 6.45. The preacidified milk is heat-treated at 180° F. for 15 seconds. The milk is then acidified ("post-acidified") to pH 5.75.

The milk is inoculated with starter culture and an amount of rennet equal to 0.20 ounces per 1000 lbs. milk (0.0012%). The milk is allowed to gel for 12 minutes and the gel is cut using curd harps or knives. The cheese curd is cooked, mixed and molded into cheese bodies.

The cheese is brined in a salt solution for 18 hours. The cheese is removed from the brine and shredded or diced. The shredded or diced cheese is refrigerated or frozen and shipped.

Analysis of the whey shows a reduction in the amount of whey protein. Mozzarella cheese whey normally contains 0.75 to 1.00% whey protein as analyzed by the Kjeldahl nitrogen method. The present process yields whey consistently containing between about 0.40% and about 0.70% whey protein when analyzed by the same method. The reduction in protein content of the whey corresponds to a significant cheese yield advantage. Also, the incorporation of whey proteins into the curd provides for an advantageous increase in the moisture content of the final cheese since these proteins bind water more effectively than other milk proteins.

The cheese curd produced from the process described herein may be passed through a mixer-molder at pH values up to 5.90. Pasta filata cheese curd produced using conventional (culture only) processes will not display the necessary elasticity until the pH has dropped below 5.60. The present invention provides a pH "safety margin" whereby the curd will not be lost if acid development ceases because of bacterial inactivity due to phage or due to other causes.

Example 17

This example describes a preferred method of making mozzarella. In this example, a starter culture with a coccus to rod ratio of 1:1 and including *Lactobacillus helveticus* is used. In addition, the curd is mixed and molded at a lower pH (5.0–5.4).

Milk is preconditioned by preacidification to pH 6.45, heat-treatment at 180° F. for 15 seconds and postacidification to pH 5.75 as described in the previous example.

The preconditioned milk is then inoculated with a bacterial culture having a coccus to rod ratio of 1:1. The culture contains a rod population that includes *Lactobacillus helveticus*. *Lactobacillus helveticus* helps prevent bitterness in the cheese and excessive browning of the cheese when baked on pizza pie.

The preconditioned, inoculated milk is set using coagulating enzyme, usually calf or microbial rennet (0.2 ounces per 1000 lbs. milk). After 12 minutes the milk coagulates and is cut and cooked in the usual manner.

The bacterial culture in the curd ferments the lactose and the curd pH decreases. When the pH of the curd has dropped to between about 5.0 to 5.4, the curd is processed further in a mixer/molder, draining table, draining belt or other suitable processing equipment. The resultant cheese may be brined, shredded and refrigerated or frozen for shipment.

Cheese produced according to the processes of the present invention performs acceptably on baked pizza after brining and without aging.

While the invention has been described with reference to certain specific embodiments thereof, it is understood that it is not to be so limited since alterations and changes may be made therein which are within the full and intended scope of the claims.

WHAT IS CLAIMED:
1. A method of making cheese comprising:
preconditioning cold, raw milk by lowering the pH to pH 6.0 to 6.6 prior to heat treating;
heat treating the preconditioned milk at about 162° F. to about 190° F.;
cooling the heat treated milk;
post-acidifying the cooled milk to pH 4.9 to 6.0;
inoculating the post-acidified milk with starter culture; and
ripening, treating with a coagulating agent to form a curd; cutting and cooking.

2. The method of claim 1 wherein said preconditioning step comprises acidifying the milk to pH 6.3 to 6.5.

3. The method of claim 1 wherein said preconditioning step comprises adding a substance selected from the group consisting of acetic acid, phosphoric acid, vinegar, lactic acid, an organic acid, an inorganic acid, bacterial acid present in food and mixtures thereof.

4. The method of claim 1 wherein said preconditioning step comprises agitating the milk and pumping an acidifying substance into the milk while the milk is under agitation.

5. The method of claim 1 wherein said preconditioning step is carried out while the raw milk is stored in a silo.

6. The method of claim 1 wherein said preconditioning step is carried out while the raw milk is contained in a balance tank.

7. The method of claim 1 wherein said preconditioning step is carried out while the raw milk is in a transfer line between a silo and balance tank.

8. The method of claim 1 wherein said heat treating step is carried out at a temperature from 162° to 190° F. for a time of approximately sixteen seconds.

9. The method of claim 1 wherein said heat treating step comprises holding the milk within the temperature range of 162° F. to 190° F. for about 16 seconds to 2 minutes.

10. The method of claim 1 wherein said cooling of heat treated milk is carried out at a temperature within the range of 50° to 112° F.

11. The method of claim 1 wherein said postacidifying step comprises adding an acidifying substance selected from the group consisting of acetic acid, phosphoric acid, vinegar, lactic acid, an organic acid, an inorganic acid, a bacterial acid present in food and mixtures thereof.

12. The method of claim 1, wherein the cheese is a pasta filata type and said post-acidifying step is carried out to obtain a pH in the range of about 5.4 to 6.0.

13. The method of claim 12 wherein said postacidifying step is carried out to obtain a pH in the range of about 5.5. to 5.8.

14. The method of claim 12 wherein said postacidifying step is carried out to obtain a pH in the range of about 5.65 to 5.70.

15. The method of claim 11 wherein said acidifying substance is metered into the milk and the milk is subjected to mixing.

16. The method of claim 1 wherein subsequent to said post-acidifying step and before inoculating with starter culture, the milk is warmed to a temperature in the range of about 84° to 112° F.

17. The method of claim 1 wherein the starter culture added comprises *Streptococcus thermophilus* and *Lactobacillus bulgaricus*.

18. The method of claim 1 wherein the starter culture added has a coccus to rod ratio in the range of 1:5 to 10:1.

19. The method of claim 1 wherein the starter culture added comprises lactic culture.

20. The method of claim 1 wherein the starter culture added comprises strains selected from the group consisting of *Streptococcus lactis, Streptococcus cremoris, Lactobacillus helveticus* and mixtures thereof.

21. The method of claim 1 wherein the inoculated milk is ripened for up to 45 minutes.

22. The method of claim 1 wherein the ripened milk is coagulated using about 0.1 to 3.0 ounces of coagulant per 1000 lbs. of milk.

23. The method of claim 22 wherein a doublestrength coagulant is added at a rate of about 0.1 to 0.15 ounces per 1000 lbs. of milk.

24. The method of claim 22 wherein the ripened milk is coagulated in 5 to 45 minutes.

25. The method of claim 1 further comprising mixing-molding at a pH of about 5.0 to 6.0.

26. The method of claim 25 wherein mixingmolding is at a pH of 5.0 to 5.4.

27. The method of claim 1 further comprising shredding or dicing the cheese directly from the brine without aging and then freezing and packaging the cheese for frozen storage and distribution.

28. The method of claim 1 further comprising salting, shredding and dicing, and freezing the cheese.

29. A method of making cottage cheese comprising the following steps:
preconditioning cold, raw milk by lowering the pH to approximately 6.0 to 6.6;
heat treating the preconditioned milk by raising the temperature to about 162° to 190° F.;
cooling to about 32° to 115° F.;
post-acidifying the heat-treated milk by lowering the pH to approximately 4.95 to 5.9; and
treating with a coagulating agent to form a curd, cutting and cooking.

30. The method of claim 29 wherein:
post-acidification is conducted by lowering the pH of the milk to about 4.95 to 5.5; and
said coagulating agent is an acidogen or a slow release acidulant.

31. The method of claim 30 wherein the acidogen or slow release acidulant is selected from the group consisting of glucono-delta-lactone, an organic acid, an inorganic acid and mixtures thereof.

32. A method of making cheese comprising:
selecting a raw milk having a pH of from 6.0 to 6.6;
subsequently heat treating the raw milk at about 162° F. to about 190° F.;
cooling the heat treated milk;
post-acidifying the cooled milk to pH 4.9 to 6.0;
inoculating the post-acidified milk with starter culture; and
ripening, treating with a coagulating agent to form a curd, cooking and cutting.

33. The method of claim 32 wherein the cheese is a pasta filata type, and the post-acidifying step is carried out to a pH of 5.4 to 6.0.

34. The method of claim 32 wherein the postacidifying step is carried out to a pH of 5.5 to 5.8.

35. The method of claim 32 wherein the postacidifying step is carried out to a pH of 5.65 to 5.70.

36. The product produced according to the method of claim 1.

37. The product produced according to the method of claim 29.

38. The product produced according to the method of claim 32.

* * * * *